US009156151B2

(12) United States Patent
Kicher et al.

(10) Patent No.: US 9,156,151 B2
(45) Date of Patent: Oct. 13, 2015

(54) SYSTEM AND METHOD FOR GARAGE DOOR COUNTERBALANCE

(76) Inventors: Paul T. Kicher, Wickliffe, OH (US); Thomas P. Kicher, Willoughby Hills, OH (US)

( * ) Notice: Subject to any disclaimer, the term of this patent is extended or adjusted under 35 U.S.C. 154(b) by 896 days.

(21) Appl. No.: 13/167,122

(22) Filed: Jun. 23, 2011

(65) Prior Publication Data

US 2011/0314649 A1 Dec. 29, 2011

Related U.S. Application Data

(60) Provisional application No. 61/357,754, filed on Jun. 23, 2010.

(51) Int. Cl.

| | |
|---|---|
| ***B23P 19/02*** | (2006.01) |
| ***B23P 19/04*** | (2006.01) |
| ***B25B 27/30*** | (2006.01) |
| ***E05D 13/00*** | (2006.01) |

(52) U.S. Cl.

CPC ................ *B25B 27/30* (2013.01); *E05D 13/12* (2013.01); *E05Y 2900/106* (2013.01); *Y10T 29/53622* (2015.01)

(58) Field of Classification Search

CPC ........ B25B 27/30; B25B 27/304; E05D 13/12
USPC ............ 29/227, 244, 256, 259, 264, 266, 240
See application file for complete search history.

(56) References Cited

U.S. PATENT DOCUMENTS 1,503,948 A 8/1924 Harris et al.
3,921,761 A 11/1975 Votroubek et al.
5,477,598 A * 12/1995 Borner, Jr. ...................... 29/227
5,778,490 A 7/1998 Curtis
6,029,331 A * 2/2000 Simmons ........................ 29/239
6,983,785 B2 1/2006 Altimore
7,537,042 B2 5/2009 Altimore
2006/0102265 A1 5/2006 Wright
2007/0137801 A1 6/2007 Kicher
2009/0178339 A1 7/2009 Kicher

OTHER PUBLICATIONS

International Search Report and Written Opinion from International Application No. PCT/US11/41599, mailed Nov. 19, 2011.

* cited by examiner

*Primary Examiner* — Lee D Wilson
*Assistant Examiner* — Seahee Yoon
(74) *Attorney, Agent, or Firm* — Calfee, Halter & Griswold LLP

(57) ABSTRACT

A tool for use in installation, adjustment and removal of an energy storage device for a counterbalance system. The tool includes a member rotatable to manipulate a spring carriage. One embodiment includes a threaded shaft, an engagement member which engages the slidable carriage, a locking nut disposed on the threaded shaft, and a bearing member disposed to the threaded shaft between the locking nut and the engagement member. A position of the slidable carriage between compressed and extended positions relative the track housing is adjustable by rotation of the threaded shaft. Another embodiment includes a frame, a cable spool rotatably attached to the frame, and having a gear attached in a co-axial arrangement to the cable spool, and a worm gear attached to the frame. The spool gear is rotatable by the worm gear to apply axial force to the slidable carriage by winding the counterbalance cable.

16 Claims, 5 Drawing Sheets

SYSTEM AND METHOD FOR GARAGE DOOR COUNTERBALANCE

CROSS REFERENCE TO RELATED APPLICATIONS

This non-provisional application claims the benefit of U.S. Provisional Patent Application No. 61/357,754, entitled "Compression System and Method for Garage Door Counterbalance," filed Jun. 23, 2010, which is hereby incorporated in its entirety, to the extent that it is not conflicting with the present application.

BACKGROUND

Counterbalance systems are known in various mechanical assemblies. For example, conventional garage doors include a mechanical torsion spring to act as a counterbalance to reduce the force required to open a garage door. An exemplary torsion spring system includes a torsion spring located on a shaft which is typically located above the door opening. One end of the torsion spring is connected to the shaft. The opposite end of the spring is anchored to the door opening. The torsion spring is preloaded during the installation process. This preloading provides the necessary torque to counterbalance, that is to say, offset the torque the garage door imposes on the shaft by its connection to the drums located on the shaft. These drums are commonly referred to as door drums. The bottom corners of a garage door are connected to the door drums via cables. When the door is opened, the shaft rotates causing the cables to assist the lifting operation and the torsion spring releases its stored energy. When the door is being closed, the cable winds off the drum and the torsion spring assists in offsetting the weight of the door as it is reloaded with energy for the next lifting operation.

Improved counterbalance designs have been developed to replace the mechanical torsion spring. One improved system and method uses a gas spring and a cable drum system. Exemplary improved systems and methods are described in U.S. Pat. No. 6,983,785 issued Jan. 10, 2006 and U.S. Pat. No. 7,537,042 issued May 26, 2009, each of which are hereby incorporated by reference in their entirety, to the extent that either does not conflict with the present application. These improved methods replace the torsion spring with a gas spring and cable drum system. However, all other door components, shaft, door drums located on the shaft, and cables connecting the lower corners of the door to the drums remain required. The gas spring, like the torsion spring, is fixed at one end. However, the opposite end is slideable along a track, rather than able to rotate around the shaft. The slideable end, herein referred to as the slideable carriage, has a pulley to allow a cable to pass around.

When the door is in the closed position a cable wraps fully around a drum, referred to as a drive drum, located on the same shaft to which the door is connected. The spring is fully compressed, when the door is closed, storing the required energy to counterbalance the door. The cable passes from the drive drum around the pulley, attached to the slideable carriage of the spring, and is anchored to a fixed position. This configuration is a 2 to 1 mechanical advantage. For every inch of stroke the gas spring provides 2 inches of cable pull off the drive drum attached to the shaft above the door. Alternatively, for every pound of force the gas spring is applying to the slideable carriage, a half pound of force is applied to the drive drum via the tension in the cable. It is the force in the cable applied to the drive drum that provides the counter torque to offset or balance the torque applied to the shaft by the door weight. When the door is lifted, the compressed gas spring extends by moving the slideable carriage. As the slideable carriage moves, the cable pulls the drive drum applying the counter torque to the shaft. When the door is lowered to the closed position, the spring is again compressed storing the required energy to offset the door weight during the closing operation while reloading the gas spring for the next cycle.

The above-described improvement was advantageous and functional, but other improvements followed. Later developments led to an improved design including a drive drum that could provide the precise torque when coupled to the appropriate gas spring. A system that standardized the components was also developed. This system approximately fixed the number of rotations the shaft made regardless of the door height. By doing so, this improvement reduced the number of different designs of the same component within a garage opener sub-assembly or assembly.

During an installation process of an energy storage device, such as for example, one or more mechanical springs or one or more gas springs, the door will be in the closed position yet the spring will be fully extended. Conversely, to remove or replace the energy storage device, the door will typically be in the closed position, and the one or more springs will be compressed putting the compression cable in tension. Without a compression tool, disconnecting the cable from the slideable carriage can be time-consuming, laborious, and hazardous, even to a well-trained technician.

SUMMARY OF THE INVENTION

The present invention describes a tool for use in installation, adjustment and removal of an energy storage device for a counterbalance system. The tool includes a member rotatable to manipulate a spring carriage. The tool may be arranged to operate as a compression tool or as a tool to provide tension, depending on the application environment.

One embodiment of the present invention includes a threaded shaft, an engagement member which engages the slidable carriage, a locking nut disposed on the threaded shaft, and a bearing member disposed to the threaded shaft between the locking nut and the engagement member. A position of the slidable carriage between compressed and extended positions relative to the track housing is adjustable by rotation of the threaded shaft.

Another embodiment of the present invention includes a frame, a cable spool rotatably attached to the frame, and having a gear attached in a co-axial arrangement to the cable spool, and a worm gear attached to the frame. The spool gear is rotatable by the worm gear to apply axial force to the slidable carriage by winding the counterbalance cable. In other words, the cable spool contains the forces to the energy storage device. The cable which provides the counter torque to the door main shaft is either attachable, or can be wrapped around the cable spool to provide enough friction to prevent slipping. The cable spool is rotated either directly or through a series of gears by a drive. As the cable is wrapped around the spool, a spring assembly is pulled by the cable thereby compressing the gas springs. The second embodiment could be mounted to some external component. This arrangement may require any of those components to have the structural integrity to carry such forces.

The inventive tool may allow the position of the energy storage device to be changed for either installation, adjustment or removal by a power tool.

BRIEF DESCRIPTION OF THE DRAWINGS

Features and advantages of the invention will become apparent from the following detailed description made with reference to the accompanying drawings.

DETAILED DESCRIPTION OF THE INVENTION

Figure 1:
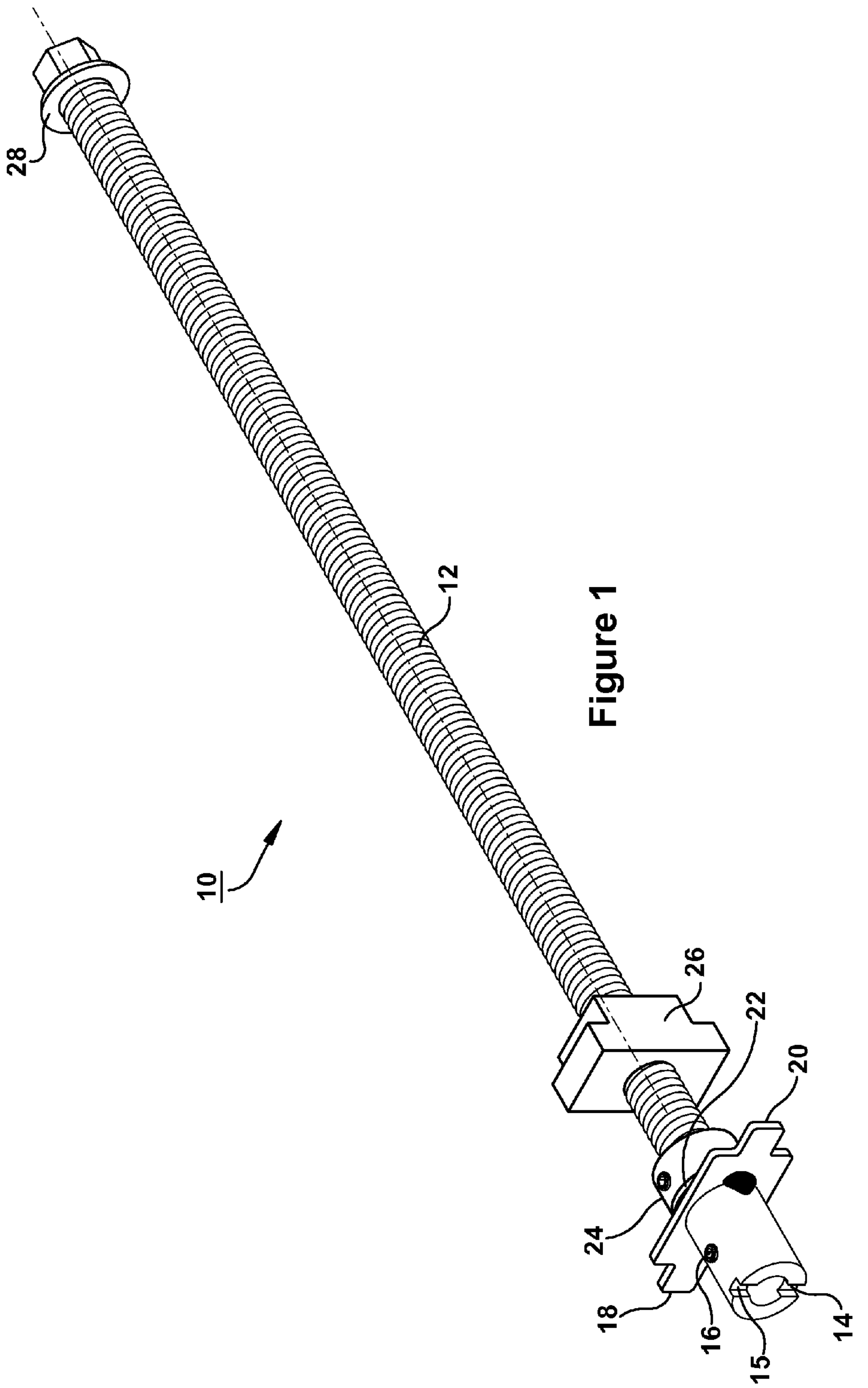
FIG. 1 is a front perspective view of a tool, showing a tool having a threaded shaft.

The Detailed Description merely describes exemplary embodiments in accordance with the general inventive concepts and is not intended to limit the scope of the invention in any way. Indeed, the invention as described by the claims is broader than and unlimited by the exemplary embodiments set forth herein, and the terms used herein have their full ordinary meaning.

Also, while the exemplary embodiments described in the specification and illustrated in the drawings relate to a garage door, it should be understood that many of the inventive features described herein may be applied to other sizes and types of structures requiring a counter balance, such as for example, larger doors, safes, gates, bridges, and other physical and mechanical barriers.

A method and apparatus for counterbalancing a garage door, the garage door described in the applications incorporated by reference, includes at least one energy storage device, such as for example, one or more mechanical springs or one or more gas springs, attached at one end to a slideable carriage and at the second end to a fixed assembly. The apparatus may include one or more of a counterbalance cable, at least one sheave, and a graduated cable drum. The graduated cable drum is located on a shaft connected to the garage door through additional cable and drums. The counterbalance cable, connectively attached at one end, is passed around a series of sheaves which are located on the gas spring end assemblies. The cable is terminated on the slideable end of the gas spring assembly. This configuration is a 5-1 mechanical advantage. In this configuration, every inch of spring stoke turns five inches of cable off of the graduated cable drum. The tension in the cable is ⅕ of the total gas spring force. When the door is in the closed position, the gas springs will be in a compressed position. When the door is opened, the springs will extend providing the necessary lift through the counterbalance cable.

An discussed, a tool of the present invention may be arranged to operate as a compression tool or as a tool to provide tension, depending on the application environment. An exemplary compression tool is beneficial in many circumstances, such as for example, during the installation and removal of an energy storage device, such as for example, one or more mechanical springs or one or more gas springs. When installing an exemplary gas spring, the door will be in the closed position and the spring will be in the fully extended position. After the spring is compressed and held in its compressed position using the compression tool, the counterbalance cable, after being wrapped around the series of sheaves, is anchored to the slideable carriage. The compression tool is then removed and the counterbalance cable is tensioned against the door weight. At this point, the door is ready for use.

For most gas spring removal situations, the door will be in the closed position, the spring will be in the compressed position and the counterbalance cable is under tension. Because the spring is compressed and the cable is tensioned, the compression tool is used to further compress the spring. The compression allows the tension to be released in the counterbalance cable. The cable anchor can be released on the slideable carriage because the counterbalance cable is already “slack” due to the additional compression of the springs. The compression tool is reversed to release the spring compression under control.

Referring now to the Figures, a compression tool 10 is illustrated in FIG. 1. The compression tool 10 includes a length of threaded rod 12. The rod 12 is suitably modified to accommodate several components of the tool 10. An engagement member 14 attaches to one end of the shaft and transfers the forces into the slideable carriage 40 (see FIG. 2). As shown in FIG. 1, the front face of the illustrated engagement member 14 has a vertical slot 15 for engaging the slidable carriage. The shape, size, and pattern of the engaging surface of the front face may vary, such as for example, to accommodate different styles and manufacturers of slidable carriages.

The locking end allows the threaded rod 12 to rotate freely while load is being applied to the slideable carriage axially. A pin 16 in the engagement member 14 fits into a groove on the threaded rod 12. The pin 16 prevents the end fitting component from dislodging from the threaded rod 12. It should be understood that other hardware and fastening elements can be used other than a pin in the practice of the present invention.

The engagement member 14 may include structure to stabilize the tool 10 within the track housing. As seen in FIG. 1, a pair of arms 18, 20 extends from the engagement member 14 in opposing directions to provide support for the tool 10 within the garage door opener system. The support arms 18, 20 are also a user convenience preventing the locking end from falling through the counterbalance system. It should be understood that the present invention can be practiced with variations in the support arms, e.g., orientation, angle, position, shape, and number.

The axial forces applied by the threaded rod 12 are transferred into the locking end through a thrust bearing 22 and a backup bearing member 24. The backup bearing member may be a collar fixed to the threaded shaft, or a unitary piece of the threaded shaft. As illustrated, the bearing member 24 is fixed to the threaded rod 12 and thereby rotates at the same speed and direction as the threaded rod 12. Because the bearing member 24 rotates and the engagement member 14 does not, it would be most advantageous to separate the two components with a thrust bearing 22, best seen in FIG. 2. This arrangement reduces the friction that would occur and, as a result, acts to reduce the torque required to turn the threaded rod 12.

Figure 2:
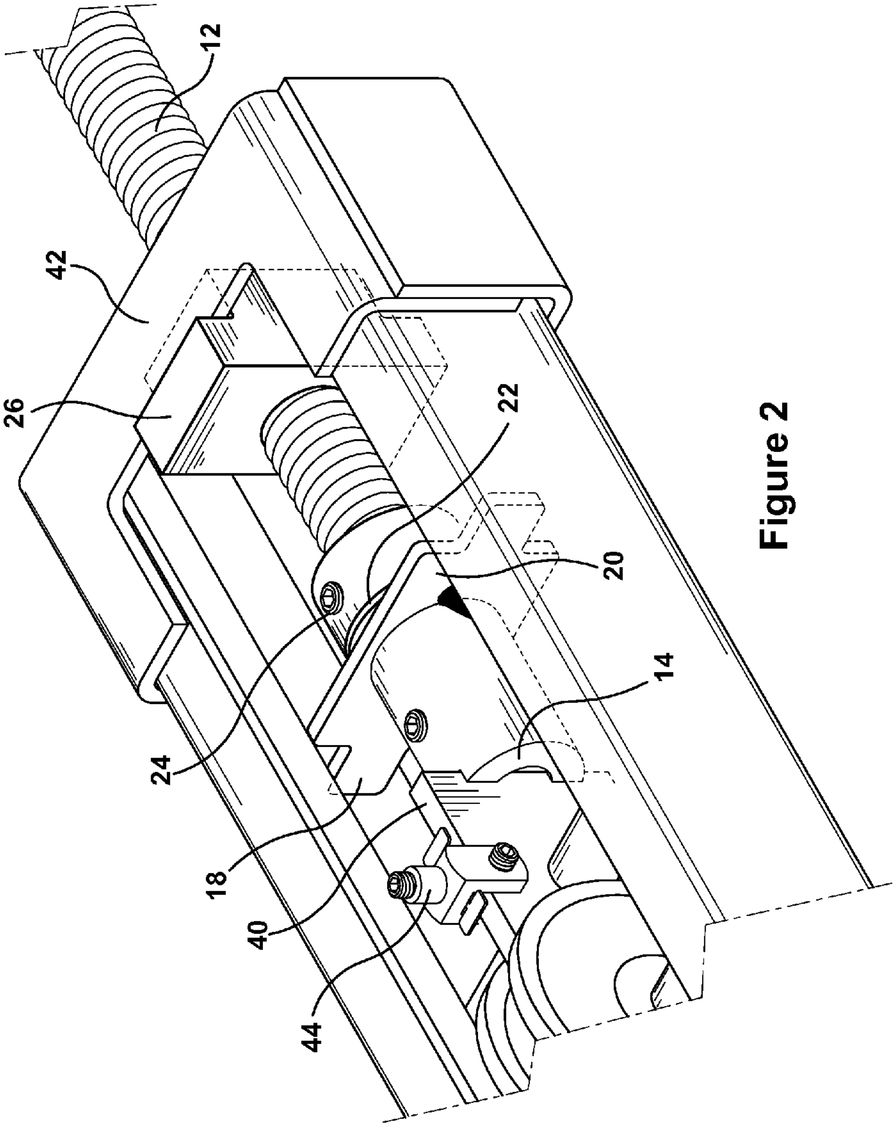
FIG. 2 is a front perspective view of the tool of FIG. 1, showing the tool engaged in a garage door counterbalance system in which a gas spring (not shown) is in an extended position.

A locking nut 26 is designed to secure the threaded rod 12 in the counterbalance system track. As shown in FIG. 2, the locking nut 26 has been designed to mate into a track end bracket 42 at a location along the threaded rod 12 remote from the engagement member 14. This fit prevents the nut 26 from turning while the threaded rod 12 is rotated. It would be advantageous to have the locking nut 26 made from a material that reduces friction and wear, such as for example, bronze. The strength of the material will also be an important consideration because the forces applied by it may be relatively high.

The distal end of the threaded rod 12 may have a mounting attachment 28, such as for example, a hex head nut. The attachment 28 allows an installer to control rotation of the threaded rod 12 in clockwise or counterclockwise directions, such as for example, with a manual tool or a power tool, such as for example, a cordless drill, a common tool used by garage door installers. A hex shape can be easily rotated with a drill by using a conventional socket. However, nearly any fitting shape is possible as long as torque can be applied through it. The fitting permits one-handed operation and creates a safer installation procedure.

Figure 3:
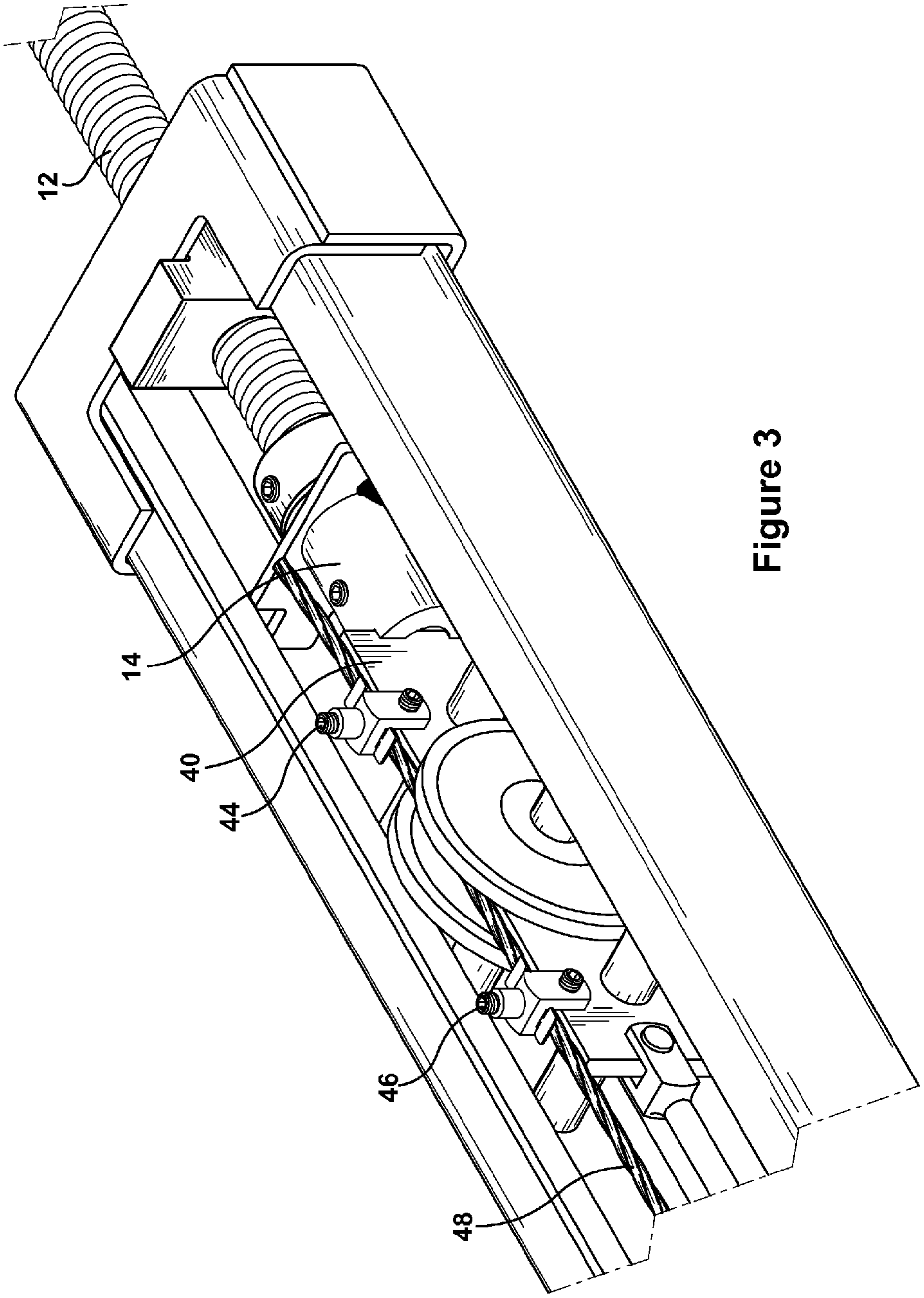
FIG. 3 is a front perspective view of the tool of FIG. 1, showing the tool engaged in a garage door counterbalance system in which a gas spring (not shown) is in an extended position.

As discussed, FIG. 2 shows the compression tool 10 engaged in a garage door counterbalance system in which a gas spring (not shown) is in an extended position. FIG. 3 shows the compression tool 10 in the same garage door counterbalance system in which the gas spring (not shown) in an extended position. In the engaged position, the arms 18, 20 ride within internal tracks of the track housing. As discussed, the engagement member 14 attaches to the slideable carriage 40. At a remote location along the threaded rod, the nut 26 engages the track end bracket 42. Anchors 44, 46 are illustrated in FIGS. 2 and 3. The anchors 44, 46 secure the counterbalance cable 48 as required during various procedural steps.

Figure 4:
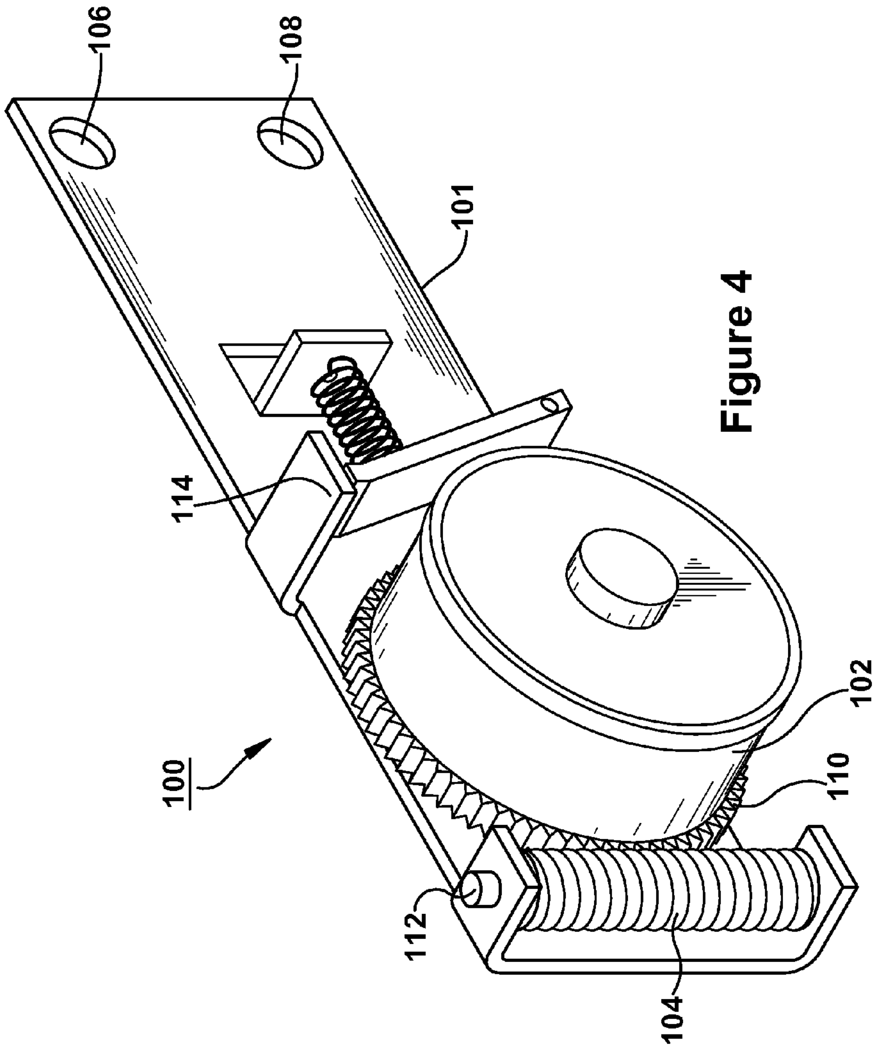
FIG. 4 is a front perspective view of another tool, showing a tool having a cable spool and worm gear.
Figure 5:
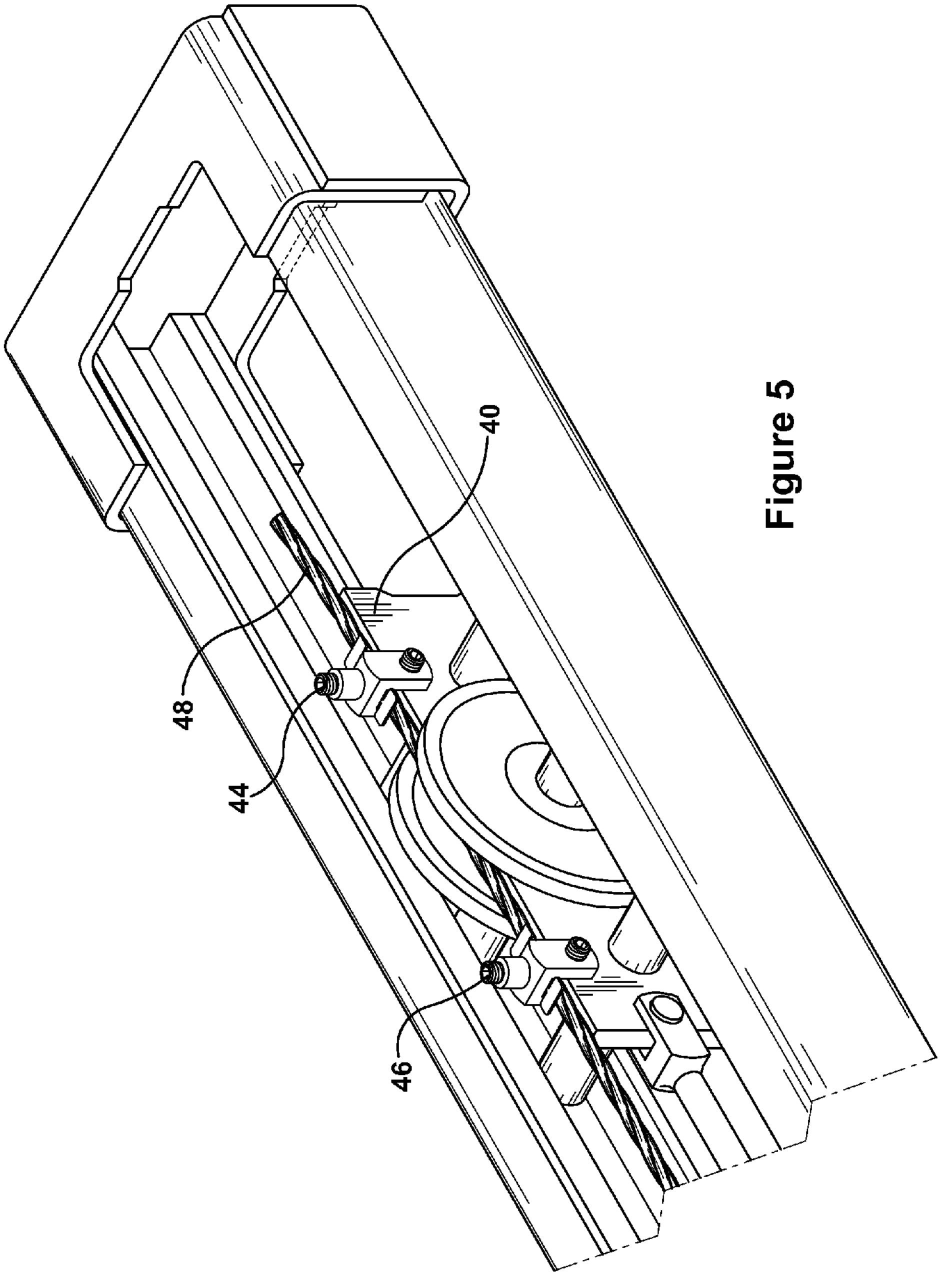
FIG. 5 is a front perspective view of a garage door counterbalance system, showing an exemplary mounting location for the tool of FIG. 4.

Another embodiment of the present invention is shown in FIG. 4. A compression tool 100 includes a cable spool 102 and a worm gear 104, each secured to a frame 101. FIG. 5 is a front perspective view of a garage door counterbalance system showing a possible mounting location for the compression tool of FIG. 4. The compression tool 100 functions similar to a capstan winch. It can lock onto the slideable carriage 40 using attachment holes 106, 108. Alternatively, the tool 100 can attach to another location that provides sufficient anchor, such as for example, a location external from the illustrated system.

Several different iterations of this embodiment can be implemented. Similar to a traditional capstan winch, the tool 100 utilizes a "friction" spool 102. The counterbalance cable 48 wraps at least one time around the friction spool. When the free end of the counterbalance cable is pulled taught, friction created by the wrap around the spool allows the cable to be continuously tensioned when the friction spool is rotated. This rotation of the spool will compress the exemplary gas spring because the counterbalance cable, under tension, will gradually become shorter.

The friction spool 102 includes a gear 110 which permits the spool to be rotated via a worm and/or reduction gear 104. As illustrated, one end 112 of the worm gear 104 is rotatable. The one end 112 may be rotatable by a power source, such as a cordless drill. The opposing end of the worm gear may also be drivable. By using a cordless drill on one or either end of the worm gear 104, an installer can enjoy one hand operation. Because the counterbalance cable will continuously be under tension, a locking mechanism 114 may be used. The locking mechanism 114 allows the cable 48 only to travel in one direction and locks the cable 48 if that direction is reversed. This locking feature provides an element of safety by permitting an installer to have both hands full while performing the spring compression operation.

The friction spool 102 can be configured to be a "take-up" spool by anchoring the end of the counterbalance cable to the spool. Friction will no longer be the means by which the cable is tensioned. A worm gear may be most advantageous because it can provide both a gearing means and a locking means.

An advantage to anchoring on the slideable carriage includes the ability to test the counterbalance without removing the compression tool. The correct spring compression could be "dialed in" by the installer. The compression tool can stay connected to the slideable carriage while the garage door is tested for balance. If the door is not balanced properly, adjustments to the counterbalance can quickly be made and the door can be retested. This "dial-in" method is a more convenient installation process because the removal and reattachment of the compression tool, a time consuming process required for conventional installations requiring door balance, is avoided.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed is:

1. A tool for use in installation, adjustment and removal of an energy storage device for a counterbalance system, which includes a slidable carriage, a counterbalance cable, and a track housing, the tool comprising:

a threaded shaft having a first end and a second end;

an engagement member attached to the threaded shaft first end and having an exposed end face, the end face engagable to a slidable carriage;

a locking nut disposed on the threaded shaft between the engagement member and the threaded shaft second end, the locking nut attachable to the track housing to secure the threaded shaft relative to the counterbalance system and prevent rotation of the locking nut by rotation of the threaded shaft; and a bearing member disposed to the threaded shaft between the locking nut and the engagement member, the bearing member being rotatable with the threaded shaft to apply axial force to the slidable carriage by the engagement member;

wherein the engagement member and the threaded shaft are positioned to be co-axial with the slidable carriage, the exposed end face of the engagement member defines an elongated recess for non-rotational engagement with the slidable carriage, and the elongated recess extends radially from the center of the engagement member in two directions;

wherein a position of the slidable carriage between a compressed position and an extended position relative to the track housing is adjustable by rotation of the threaded shaft second end.

2. The tool of claim 1 wherein rotation of the threaded shaft second end in a direction toward the engagement member moves the slidable carriage toward the compressed position.

3. The tool of claim 1 wherein rotation of the threaded shaft second end in a direction away from the engagement member moves the slidable carriage toward the extended position.

4. The tool of claim 1 wherein the bearing member is rotatable with the threaded shaft to balance force applied to the engagement member.

5. The tool of claim 4 wherein the threaded shaft second end permits axial force application to the slidable carriage by at least one-hand operation of an installer.

6. The tool of claim 1 comprising a mounting attachment disposed on the threaded shaft second end and drivable by a power tool.

7. The tool of claim 1 comprising at least one arm extending from the engagement member into the track housing, and slidable relative to the track housing upon rotation of the threaded shaft.

8. The tool of claim 1 comprising a thrust bearing fixed to the threaded shaft between the engagement member and the bearing member.

9. The tool of claim 1 wherein the engagement member defines a sectional profile sufficient to permit the passage of the counterbalance cable within the track housing and relatively parallel to the threaded shaft.

10. The tool of claim 1 wherein the threaded shaft and the bearing member are a unitary piece.

11. The tool of claim 1, wherein the engagement member protrudes outward from the threaded shaft.

12. A tool for use in installing an energy storage device for a counterbalance system, the tool comprising:

a threaded shaft having a proximal end and a distal end;

an engagement member attached to the threaded shaft at the proximal end, the engagement member having an exposed proximal face and the face defining an elongated engagement cavity;

a locking nut disposed on the threaded shaft between the engagement member and the threaded shaft distal end; and a bearing member fixed to the threaded shaft between the locking nut and the engagement member, the bearing member being rotatable with the threaded shaft;

wherein the engagement member and the threaded shaft are positioned to be co-axial with the slidable carriage;

wherein the elongated engagement cavity extends radially from the center of the engagement member in two directions;

wherein rotation of the locking nut may be a prohibited such that a position of the engagement member relative to the locking nut is adjustable by rotation of the threaded shaft distal end.

13. The tool of claim 12, the engagement member further comprising at least one arm extending from a center of the engagement member, wherein rotation of the at least one arm may be prohibited such that the engagement member is slidable relative to the locking nut upon rotation of the threaded shaft.

14. The tool of claim 12, wherein the engagement cavity comprises a slot.

15. A tool for use in installing an energy storage device for a counterbalance system, the tool comprising:

a threaded shaft having a proximal end and a distal end;

an engagement member attached to the threaded shaft at the proximal end, the engagement member having an exposed proximal face and the face defining an engagement cavity;

a locking nut disposed on the threaded shaft between the engagement member and the threaded shaft distal end; and a bearing member fixed to the threaded shaft between the locking nut and the engagement member, the bearing member being rotatable with the threaded shaft;

wherein the engagement cavity extends from an edge of the exposed proximal face to an opposing edge;

wherein rotation of the locking nut may be a prohibited such that a position of the engagement member relative to the locking nut is adjustable by rotation of the threaded shaft distal end.

16. The tool of claim 15, wherein the engagement member and the threaded shaft are positioned to be co-axial with the slidable housing.

* * * * *